UNITED STATES PATENT OFFICE 2,576,006

METHODS OF FORMING SHAPED FIBRIN PRODUCTS

John D. Ferry and Peter R. Morrison, Madison, Wis., assignors to Research Corporation, New York, N. Y., a corporation of New York No Drawing. Application November 29, 1947, Serial No. 788,954

6 Claims. (Cl. 154—83)

This invention relates to fibrin products having novel characteristics and to methods of preparing the same.

In our co-pending applications, Serial Nos. 507,903, now abandoned, and 507,904, now Patent No. 2,533,004, both filed on October 27, 1943, we have described and claimed novel fibrin clots and products, and methods for their preparation. The present application relates to further treatments of the films described in said application Serial No. 507,903, and to improvements and modifications in the treatments described in said application Serial No. 507,904 to produce fibrin products having highly valuable and improved properties.

One object of the present invention is the provision of fibrin products having improved water-equilibrated mechanical properties and to methods for producing the same. One valuable use of these fibrin products involves their implantation in animal body tissue either in the form of films or in some other physical form or shape. Since, as thus implanted, the products are in a state of equilibrium with tissue fluids (which is substantially equivalent to a state of equilibrium with water) their water-equilibrated mechanical properties are of fundamental interest and importance. The invention is particularly concerned with such water-equilibrated mechanical properties as tensile strength and modulus of elasticity.

A further object of the invention is the production of steam-sterilized fibrin products which have survived a treatment comparable in bactericidal action to that of standard sterilization procedures, with the result that, in the manufacture of products of this invention designed for surgical use, a final steam-sterilization step may be included. Such a step is much more easily performed and bactericidally more reliable than manufacture by aseptic technique.

The fibrin films of our co-pending application, Serial No. 507,903, cannot be heat-sterilized without substantial degradation of the fibrin accompanied by materially lowered tensile strength and loss of elasticity. Where a plasticizer such as glycerol displaces the water in the fibrin film, as described in our application Serial No. 507,904, the film withstands heat treatment somewhat better but again, as stated in said application, "protracted heating decreases the tensile strength and maximum elongation." Glycerol still has a degrading influence on the protein at elevated temperature though it is not as pronounced as that of water.

If then the materials of said prior applications are subjected to conventional sterilization techniques involving, for example, autoclaving at 120° C.± for twenty minutes more or less, their pre-sterilization physical properties are substantially impaired, if not wholly lost, as is the case with protein materials generally. On the contrary, the steam-sterilized products of this invention display improved water-equilibrated physical properties over the pre-sterilization properties, increasing their usefulness.

A fresh or intermediate stage fibrin clot comprising the product described in our application, Serial No. 507,903, may be prepared by the methods therein set forth from whole blood by separating the corpuscles by centrifugation, precipitation from the resulting plasma of fibrinogen, as by cooling the plasma to 0° C. to −3° C. and adding thereto an organic precipitant such as ethanol at controlled hydrogen ion concentration, ionic strength and pH, drying of the fibrinogen from a frozen state, and dissolution of the dried powder to a concentration of about 0.5% to 2% at 25° C., and clotting by addition to the fibrinogen solution at controlled pH and ionic strength of a clotting agent such as purified thrombin. The clots are then turned out on sheets of fine muslin and pressed between pieces of plate glass at a pressure of about 0.4 pounds per square inch to expel the synergetic fluid. The compaction time is dependent upon the concentration of thrombin solution previously added. In general the thrombin solution should be added in an amount to make a final concentration of about 0.3 units per cc. for optimal compaction time.

The thrombin unit referred to is that amount of thrombin which will clot one cc. of 1% fibrinogen solution at a pH of 7 and an ionic strength of 0.3 at 25° C. in fifteen seconds.

Fibrin film, as thus prepared in accordance with the disclosure of Serial No. 507,903, comprises a rubbery white opaque sheet containing about 30% fibrin and 70% water; its tensile strength in equilibrium with water may be in about the range—160–220 g./mm.² and it may have an elongation of about 210–260% at break.

We have found that such a sheet may, in accordance with this invention, have its water-equilibrated tensile strength substantially increased above 220 g./mm.$^2$, and to as high as 550 g./mm.$^2$, without material reduction in elongation by first increasing its fibrin content by desiccation or by the application of pressure to a value greater than 50% and preferably from 75–85% and then heating the sheet as by exposure to the action of steam at a temperature above the boiling point of water. The friability of the material is also reduced by this treatment.

When a protein like fibrin is thus desiccated, the moisture content at the same time of initial application of steam is evidently low enough to render protein degradation minimal for a sufficient period of time at least to establish cross-linkages to such an extent that the product can successfully withstand further application of heat after the moisture content has risen to a value which normally suffices to cause degradation at that temperature of a fresh fibrin film lacking such cross-linkages, but one which is conducive to bactericidal action to sterilize the product.

The surprising fact is that, by the relatively simple preparatory step of elevating proportionate fibrin content, successful steam-sterilization can be accomplished.

The following is a more detailed description of the treatment.

A fibrin film having a water-equilibrated fibrin content of about 29%, the remainder being substantially all water, and having a water-equilibrated tensile strength of between 160 and 220 g./mm.$^2$ and an elongation at break averaging between 210 and 260% was partially desiccated to reduce the moisture content to about 20%, at which fibrin concentration the film was not too brittle to handle. The film was then autoclaved in saturated steam at fifteen pounds per square inch (120° C.) for twenty minutes. During the steaming, the moisture content of the film rose to about 25%.

In equilibrium with water, the fibrin content of the steam-sterilized product had increased from the original 29% to 57%, the elongation at break was substantially that of the film prior to sterilization, the tensile strength had shown a marked improvement from below 220 to about 500 g./mm.$^2$ and the friability was reduced. The material showed a high initial modulus of elasticity, and easier extension from 30–100% and a firming-up before break. The percent elongation plotted against stress in grams per square mm. forms an S-shaped curve, as distinguished from a linear modulus of the fibrin prior to desiccation and steam treatment. The opaque film had become transparent and was no longer permeable to hemoglobin.

The properties of the treated film, particularly with respect to tensile strength and resistance to swelling in water and in acids are far superior to those of the untreated film and sufficiently superior to that of glycerol plasticized film which has been heat-treated to place the treated film of this invention on a different plane of usefulness. Further, glycerol sterilization involves an aseptic transfer making this procedure unsuitable for commercial use. Glycerol or other polyhydric alcohol plasticized films exhibit reduced tensile strength upon subjection to heat and their water-equilibrated fibrin contents do not exceed about 45%.

A modification of the treatment of this invention leads to the production of shaped products including tubes and cups, for example, intended for specific surgical applications. This procedure depends upon two effects of the heat treatment on the fibrin. Thin layers of film which have been pressed together in contact before steaming adhere to each other, and, if the film is stretched to conform to a new shape before steaming, the stresses introduced are relaxed and the new shape is fixed.

In making seamless fibrin tubing, the moisture content of a strip of fibrin film is adjusted to about 50% (at which point the mechanical properties are optimal for manipulation), and the strip is rolled with slight tension about a cylindrical form. Ordinarily a strip of sufficient length to make ten or more successive layers is employed. The film is then further desiccated to a moisture content of 20% and autoclaved as previously described. The steam treatment forms a strong, seamless tube, which can be removed from the cylindrical form at any time by immersion in water or salt solution.

In making cup-shaped objects, the fibrin film is desiccated to a moisture content of about 50% and stretched over a spherical form, and the edges are tied. Several successive layers may be used to build up the thickness. The moisture content is further reduced to 20% and the film is autoclaved. The steam releases the stresses and fixes the film in the shape of the form.

As in the case of the products of our previous application, Serial No. 507,904, the products hereof may be suitable for many uses including surgical use as burn and wound coverings, tendon sheaths, orthopedic cups, artificial catgut, in prevention of meningocerebral adhesions and as a dural substitute, in inducing nerve regeneration and in the form of tubes in blood vessel anastomosis.

We claim:

1. That method of treating fibrin for improving its water-equilibrated mechanical properties comprising adjusting the moisture content of a clot of intact fibrin to a value of about 15–25% and subjecting the clot at the adjusted value to the action of steam at a temperature of the order of 100–155° C.

2. That method of treating fibrin which comprises heating a clot of intact fibrin at a fibrin content of 75–80% to a temperature above the boiling point of water.

3. That method of improving the tensile strength of steam sterilized fibrin which comprises adjusting the fibrin content of a clot of intact fibrin to between 75 and 80% prior to sterilization and then sterilizing the clot by subjecting it to the action of steam.

4. The method of improving the water-equilibrated mechanical properties of clotted fibrin having a water-equilibrated moisture content in excess of 50% comprising increasing the fibrin content to 75–85% by removal of moisture from a clot of intact fibrin and heating the desiccated clot.

5. The method of forming shaped fibrin products comprising adjusting the moisture content of a clot of intact fibrin to a value of about 50% affording ready manipulation, shaping the clot about a form, reducing the moisture content of the clot to a value of about 15–25%, subjecting the shaped clot to the action of steam and removing the steamed product from the form.

6. The method of forming shaped fibrin products comprising adjusting the moisture content of a clot of intact fibrin to a value of about 50% affording ready manipulation, shaping the clot in a series of laminations about a form, reducing the moisture content of the shaped clot to a value of about 15-25%, subjecting the shaped product to the action of steam and removing the steamed laminated product from the form.

JOHN D. FERRY.
PETER R. MORRISON.

REFERENCES CITED

The following references are of record in the file of this patent:

UNITED STATES PATENTS

| Number | Name | Date |
|---|---|---|
| 2,385,802 | Ferry | Oct. 2, 1945 |
| 2,385,803 | Cohn et al. | Oct. 2, 1945 |

OTHER REFERENCES

Ferry et al., Journal Clinical Invest., vol. 23, pp. 566-572, 1944.

Cohn Science, vol. 101, pp. 51-56, January 19, 1945.

Harvey, Boston Medical and Surgical Journal (May 4, 1916), vol. CLXXIV, No. 18, pages 658 and 659.

Ferry and Morrison, Industrial and Engineering Chemistry (December 1946), vol. 38, No. 12, pages 1217-1221.